United States Patent [19]

Breckenfeld et al.

[11] Patent Number: 4,669,988
[45] Date of Patent: Jun. 2, 1987

[54] MARINE ENGINE COOLING SYSTEM VALVE ASSEMBLY

[75] Inventors: Paul W. Breckenfeld, Winthrop Harbor; George L. Broughton, Waukegan; Ronald E. Gibbs, Mundelein; James E. Macier, Waukegan, all of Ill.; H. Norman Petersen, Kenosha, Wis.

[73] Assignee: Outboard Marine Corporation, Waukegan, Ill.

[21] Appl. No.: 640,023

[22] Filed: Aug. 9, 1984

[51] Int. Cl.$^4$ ............................................. B63H 21/26
[52] U.S. Cl. ..................................... 440/88; 123/41.13
[58] Field of Search ........................ 440/88; 137/599.2; 123/41.08, 41.05, 41.13; 236/34, 34.5; 138/39

[56] References Cited

U.S. PATENT DOCUMENTS

| | | | |
|---|---|---|---|
| 1,952,198 | 3/1934 | Findley | 236/34 |
| 2,926,853 | 3/1960 | Wood | 236/34 |
| 2,954,930 | 10/1960 | Linder | 236/34.5 |
| 3,395,580 | 8/1968 | Kuze | 236/34 |
| 3,667,431 | 6/1972 | Kveny et al. | 123/41.08 |
| 3,768,731 | 10/1973 | Lavado | 236/34.5 |
| 3,918,418 | 11/1975 | Horn | 123/41.08 |
| 4,327,673 | 5/1982 | Schroeder | 123/41.08 |
| 4,457,727 | 7/1984 | Flaig | 440/88 |

*Primary Examiner*—Galen L. Barefoot
*Assistant Examiner*—Edwin L. Swinehart
*Attorney, Agent, or Firm*—Michael, Best & Friedrich

[57] ABSTRACT

A marine propulsion device comprising an internal combustion engine including a coolant conduit having an upstream conduit portion, a downstream conduit portion, and a passage portion extending between the upstream portion and the downstream portion. The engine also includes a mechanism for controlling the flow of coolant through the coolant conduit, the controlling mechanism including a valve assembly located in the passage portion and including therein an opening, a temperature responsive mechanism located in the valve assembly and movable relative to the opening for opening and closing the opening in response to temperature variations, a first housing including a passageway communicable between the downstream conduit portion and the opening, a second housing including a passageway communicable between the upstream conduit portion and the opening, and threaded portions on the first housing and the second housing for releasably connecting the first housing and the second housing to form an enclosure containing the temperature responsive mechanism.

16 Claims, 6 Drawing Figures

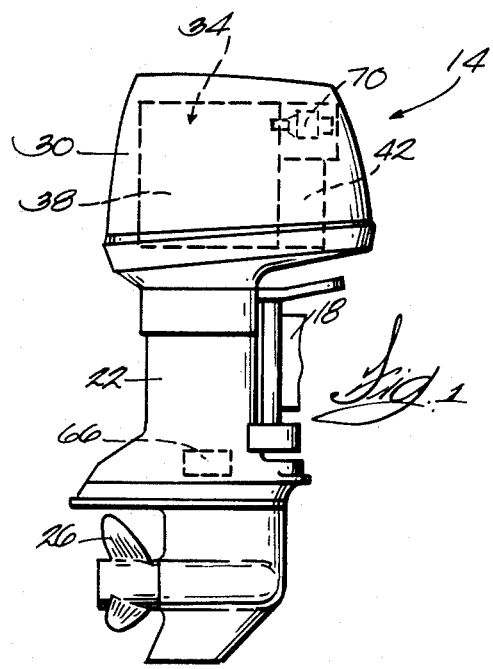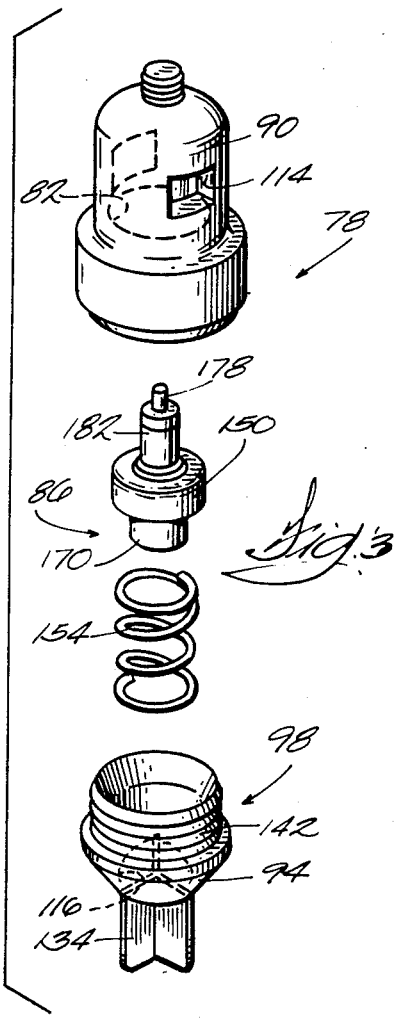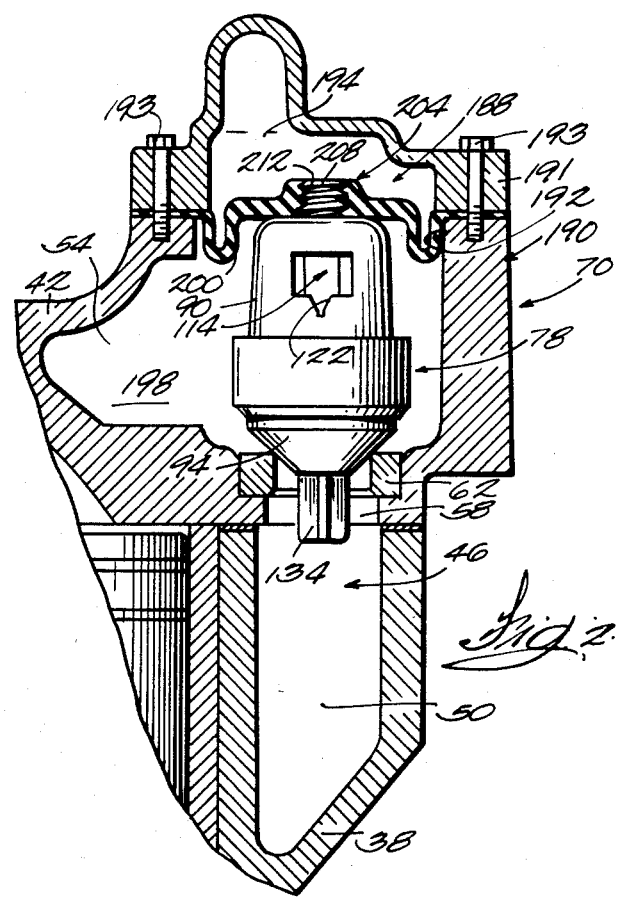

MARINE ENGINE COOLING SYSTEM VALVE ASSEMBLY

BACKGROUND OF THE INVENTION

This invention relates to valve assemblies for use in the cooling systems of internal combustion engines and, more particularly, to valve assemblies used in marine engines, particularly in pressure controlled cooling systems.

Attention is directed to the Wood U.S. Pat. No. 2,926,853 issued Mar. 1, 1960, which discloses a double valve thermostat, and to the Flaig U.S. Pat. No. 4,457,727 issued July 3, 1984, which discloses a marine propulsion device including means for controlling the flow of coolant through a cooling system.

SUMMARY OF THE INVENTION

This invention provides a marine propulsion device comprising an internal combustion engine including a coolant conduit having an upstream conduit portion, a downstream conduit portion, and a passage portion extending between the upstream conduit portion and the downstream conduit portion, and means for controlling the flow of coolant through the coolant conduit. The controlling means includes a valve assembly located in the passage portion and including therein an opening, temperature responsive means located in the valve assembly and movable relative to the opening for opening and closing the opening in response to temperature variations, a first housing including a passageway communicable between the downstream conduit portion and the opening, a second housing including a passageway communicable between the upstream conduit portion and the opening, and means for releasably connecting the first housing and the second housing to form an enclosure containing the temperature responsive means.

This invention also provides a valve assembly for an internal combustion engine including a coolant conduit having an upstream conduit portion, a downstream conduit portion, and a passage portion extending between the upstream conduit portion and the downstream conduit portion. The valve assembly is adapted to be located in the passage portion and includes therein an opening, temperature responsive means located in the valve assembly and movable relative to the opening for opening and closing the opening in response to temperature variations, a first housing including a passageway communicable between the downstream conduit portion and the opening, a second housing including a passageway communicable between the upstream conduit portion and the opening, and means for releasably connecting the first housing and the second housing to form an enclosure containing the temperature responsive means.

In one embodiment of the invention, the first housing is fabricated from plastic and includes the opening therein, and the second housing is fabricated from plastic and is located in the passage portion. The temperature responsive means comprises a valve unit including a valve surface movable relative to the opening, a container portion having therein a temperature responsive material, and a piston movable relative to the valve surface in response to expansion and contraction of the temperature responsive material, and engageable with the first housing to displace the valve surface away from the opening in response to expansion of the temperature responsive material. The temperature responsive means also includes biasing means operable between the valve unit and the second housing for biasing the valve surface toward the opening.

In one embodiment, the first housing has a hollow interior including a upper portion having therein a rim partially defining the opening, and a lower portion larger than the rim. The second housing is also hollow.

In one embodiment, the means releasably connecting the first housing to the second housing comprises one of the first housing and the second housing including a threaded male portion, and the other of the first housing and the second housing including a mating female portion.

One of the principal features of the invention is the provision of a valve assembly for use in a coolant conduit of an internal combustion engine, which valve assembly is easily removable from the internal combustion engine for service and repair.

Another of the principal features of the invention is the provision of such a valve assembly which can be easily disassembled in order to replace a temperature responsive mechanism inside the valve assembly.

Another of the principal features of the invention is the provision of a valve assembly for use in a marine engine cooling system utilizing salt water, which valve assembly includes a housing which is not subject to corrosion by the salt water.

Other features and advantages of embodiments of the invention will become apparent by reference to the following description, claims and drawings.

BRIEF DESCRIPTION OF THE DRAWINGS

FIG. 1 is a side elevation partial schematic view of a marine propulsion device embodying various of the features of the invention.

FIG. 2 is an enlarged view, partially in cross section, of a portion of an internal combustion engine shown schematically in FIG. 1.

FIG. 3 is an exploded view of a valve assembly shown in FIG. 2.

Figure 4:
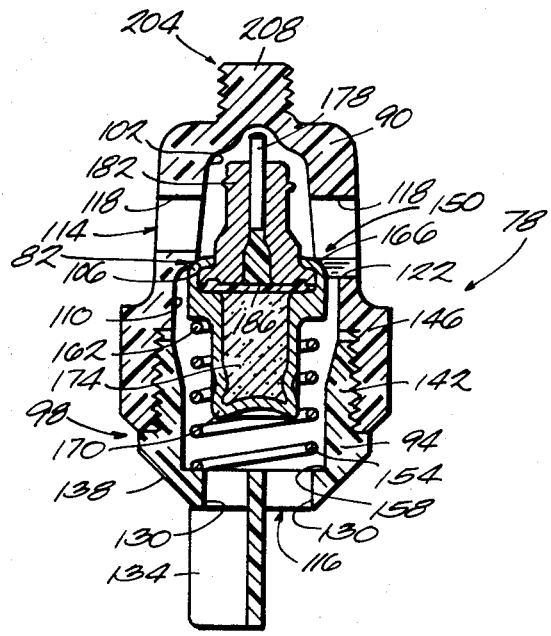
FIG. 4 is a cross sectional view of the valve assembly shown in FIG. 3, with the valve assembly in a valve closed position.

Before explaining one embodiment of the invention in detail, it is to be understood that the invention is not limited in its application to the details of construction and the arrangement of components set forth in the following description or illustrated in the drawings. The invention is capable of other embodiments and being practiced and carried out in various ways. Also, it is to be understood that the phraseology and terminology employed herein is for the purposes of description and should not be regarded as limiting.

DESCRIPTION OF THE PREFERRED EMBODIMENT

Shown schematically in the drawings and particularly in FIG. 1 is a marine propulsion device 14 in the form of an outboard motor, the outboard motor being adapted to be supported on a boat 18 and including a lower unit 22 supporting a propeller 26. The outboard motor 14 also includes a powerhead 30 comprising an engine 34 including an engine block 38 and a cylinder head 42. As particularly shown in FIG. 2, the engine block 38 and cylinder head 42 include a coolant conduit or passage 46. The coolant conduit 46 communicates with coolant passages (not shown) in the engine block 38 and the cylinder head 42, and is shown including an upstream portion 50, a downstream portion 54, and a passage portion 58 including an annular valve seat 62. The passage portion 58 provides communication between the upstream portion 50 and the downstream portion 54.

As illustrated schematically in FIG. 1, the outboard motor 14 also includes means 66 for providing a flow of cooling water through the coolant conduit 46. This means 66 for providing a flow of cooling water through the coolant conduit 46 can be a conventional pump and will not be described in detail. In embodiments such as an outboard motor, the means 66 for providing the flow of cooling water will usually take water surrounding the lower end of the lower unit 22 and pump it through the coolant conduit 46. When the lower end of the outboard motor 14 is submerged in salt water, salt water thus passes through the coolant conduit 46.

The cooling water is intended to flow through the coolant conduit 46 to maintain a controlled temperature in the engine 34. At low speeds, the engine 34 is intended to operate at relatively high temperatures, and only a relatively small amount of water is pumped through the coolant conduit. However, when the engine speed is increased, it is desirable that the engine temperature be reduced by providing a substantially increased flow of water through the coolant conduit 46.

In order to provide for such a flow of cooling water through the coolant conduit 46, means 70 is provided for controlling the flow of cooling water through the coolant conduit 46 in response to the temperature of the engine 34 by increasing the flow of cooling water through the coolant conduit 46 as the engine temperature increases, and by decreasing the flow of water through the cooling conduit 46 as the engine temperature decreases. The means 70 for controlling the flow of cooling water through the engine also provides for substantially unrestricted flow of water through the coolant conduit 46 after the engine reaches an increased speed.

As illustrated in FIG. 2, the means 70 for controlling the flow of coolant through the coolant conduit 46 in response to the temperature of the engine 34 includes a valve assembly 78 located in the passage portion 58, which valve assembly 78 permits fluid flow therethrough in response to the temperature of the engine 34, i.e., the temperature of the coolant in the coolant conduit 46. As illustrated in FIG. 3, the valve assembly 78 includes an opening 82, temperature responsive means 86 located in the valve assembly 78 and movable relative to the opening 82 for closing the opening 82 at coolant temperatures below a predetermined temperature and for opening the opening 82 at coolant temperatures above a predetermined temperature, a first housing 90, a second housing 94, and means 98 releasably connecting the first housing 90 and the second housing 94 to form an enclosure containing the temperature responsive means 86.

The first housing 90 includes a passageway 114 communicable between the downstream conduit portion 54 and the opening 82, and the second housing includes a passageway 116 communicable between the upstream conduit portion 50 and the opening 82.

In the illustrated embodiment, the first and second housings 90 and 94, respectively, are fabricated from plastic to inhibit corrosion of the valve assembly 78 when salt water is used as coolant in the coolant conduit 46.

Figure 5:
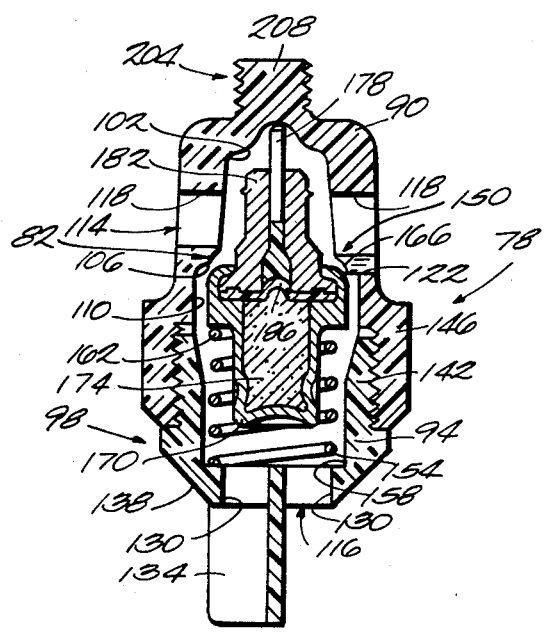
FIG. 5 is a cross sectional view of the valve assembly shown in FIG. 3, with the valve assembly in a valve open position.

More particularly, as illustrated in FIGS. 4 and 5, the first housing 90 has a hollow interior including a upper portion 102 having therein a rim 106 partially defining the opening 82, and a lower portion 110 larger than the rim 106. The first housing passageway 114 comprises a pair of opposite apertures 118 communicable with the upper portion 102 of the hollow interior. One of the apertures 118 includes a V-shaped cut-out 122 to ease fluid flow around the temperature responsive means 86 when the valve assembly 78 is opened.

Figure 6:
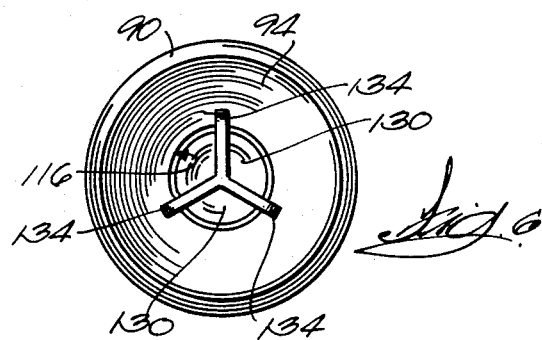
FIG. 6 is an end view of the valve assembly shown in FIG. 3.

The second housing 94 is hollow, and as illustrated in FIG. 6, the second housing passageway 116 comprises three voids 130 which are in the second housing 94 and which are separated by three intersecting ribs 134 extending from the second housing 94. The ribs 134 assist in maintaining proper alignment between the valve assembly 78 and the passage portion 58 of the coolant conduit 46. The second housing 94 also includes a generally circular angled outer portion 138 which engages the valve seat 62.

The means 98 for releasably connecting the first housing 90 and the second housing 94 to form an enclosure containing the temperature responsive means 86 comprises a threaded male portion 142 of the second housing 94 which is receivable in a mating female portion 146 of the first housing 90.

As illustrated in FIG. 3, the temperature responsive means 86 movable relative to the opening 82 for opening and closing the opening 82 comprises a valve unit 150, and biasing means 154 operable between the valve unit 150 and the second housing 94 for biasing the valve unit 150 towards the opening 82. In this embodiment, the biasing means 154 is in the form of a helical spring which is located between an abutment 158 (FIGS. 4 and 5) in the second housing 94, and an abutment 162 on the valve unit 150.

The valve unit 150 is commercially available and, as illustrated in FIGS. 4 and 5, includes a valve surface 166 movable relative to the opening 82, a container portion 170 having therein a temperature responsive material 174, and a piston 178 slidably received in an extension portion 182 of the valve unit 150. The piston 178 is movable relative to the valve surface 166 in response to expansion and contraction of the temperature responsive material 174, and is engageable with the first housing 90, as illustrated in FIG. 5, to displace the valve surface 166 away from the opening 82 in response to expansion of the temperature responsive material 174. When the temperature responsive material 174 contracts, as illustrated in FIG. 4, the spring 154 moves the valve surface 166 back into engagement with the opening 82 and thereby retracts the piston 178 toward the valve surface 166.

Any suitable temperature responsive material which expands when heated and which contracts when cooled can be used. A flexible membrane 186 is also provided as a barrier between the temperature responsive material 174 and the piston 178.

The means 70 for controlling the flow of coolant through the coolant conduit 46 further includes means 188 for locating the valve assembly 78 in the passage portion for movement between a first position wherein the second housing portion 138 engages the valve seat 62, and a second position wherein the second housing portion 138 is spaced from the valve seat 62. This means 188 provides for a substantially unrestricted flow of coolant water through the coolant conduit 46 in response to an increase in coolant pressure resulting from an increase in engine speed.

More particularly, the means 188 for locating the valve assembly 78 in the passage portion 58 includes a housing 190 which is formed in the cylinder head 42 and which includes a cap 191 over an opening 192 in the cylinder head 42. The cap 191 is releasably secured to the cylinder head 42 by fastening means in the form of bolts 193, and is easily removable to provide access to the valve assembly 38. The housing 190 has a first chamber 194 and a second chamber 198 in communication with the downstream portion 54 of the coolant conduit 46, and the means 188 further includes a diaphragm 200 fixedly connected at its periphery between the cap 191 and the cylinder head 42, which diaphram 200 separates the first and second chambers 194 and 198, respectively.

Means 204 is also provided for releasably connecting the valve assembly 78 to the diaphragm 200 to effect movement of the valve assembly 78 by diaphragm movement in response to pressure changes in the chambers 194 and 198. More particularly, the means 204 for releasably connecting the valve assembly 78 to the diaphragm 200 comprises a threaded extension 208 on the first housing 90, and a mating opening 202 in the center of the diaphragm 200.

When the cap 191 is removed, the diaphragm 200 and valve assembly 78 can be removed for inspection and replacement, if necessary. Furthermore, the first housing 90 and the second housing 94 can then be disassembled to provide access to the valve unit 150 for inspection and replacement, if necessary.

Means (not shown) are further provided for maintaining fluid pressure on the first chamber side of diaphragm 200 when the engine 34 is running at a low speed to thereby cause the valve assembly 78 to be forced against the valve seat 62 and prevent the flow of cooling water around the valve assembly 78 and through the passage portion 58. Such means is more fully disclosed in Flaig U.S. Pat. No. 4,457,727 issued July 3, 1984, which is incorporated herein by reference.

Various features of the invention are set forth in the following claims:

We claim:

1. A marine propulsion device comprising an internal combusion engine including a coolant conduit having an upstream conduit portion, a downstream conduit portion, and a passage portion extending between and connecting said upstream conduit portion and said downstream conduit portion, and means for controlling the flow of coolant through said coolant conduit, said controlling means including a valve assembly located interiorly of said passage portion and including a first housing including a passageway communicating with said downstream conduit portion, a second housing including a passageway communicating with said upstream conduit portion, and means for releasably connecting together said first housing and said second housing so as to form a housing assembly located in the passage portion and including interiorly thereof a combined passage formed by said passageways, one of said housings including a valve seat surface partially defining said combined passage, and temperature responsive means located within said housing assembly and including a valve surface selectively engagable with said valve seat surface to control coolant flow through said combined passageway.

2. A marine propulsion device in accordance with claim 1 wherein said first housing is fabricated from plastic and wherin said second housing is fabricated from plastic.

3. An internal combustion engine including a coolant conduit having an upstream conduit portion, a downstream conduit portion, and a passage portion extending between and connecting said upstream conduit portion and said downstream conduit portion, and means for controllling the flow of coolant through said coolant conduit, said controlling means including a valve assembly comprising a first plastic housing including therein a passageway communicating with said downstream conduit portion, a second plastic housing located in said passage portion and including a passageway communicating with said upstream conduit portion, means for releasably connecting together said first housing and said second housing so as to form a housing assembly located interiorly of the passage portion and including interiorly thereof a combined passage formed by said passageways, one of said housings including a valve seat surface partially defining said combined passage, and temperature responsive means located in said housing assembly and movable relative to said valve seat surface for opening and closing said combined passage in response to temperature variations.

4. An internal combustion engine in accordance with claim 3 wherein said temperature responsive means comprises a valve unit including a valve surface movable relative to said valve seat surface, a container portion having therein a temperature responsive material, and a piston movable relative to said valve surface in response to expansion and contraction of said temperature responsive material and engageable with said first housing to displace the valve surface away from said valve seat surface in response to expansion of said temperature responsive material, and biasing means operable between said valve unit and said second housing for biasing said valve surface towards said valve seat surface.

5. An internal combustion engine in accordance with claim 3 wherein said passage portion includes a valve seat, and wherein said second housing includes a portion which is engageable with said valve seat, and wherein said means for controlling the flow of coolant through said coolant conduit further includes means for locating said valve assembly in said passage portion for movement between a first position wherein said valve assembly portion engages said valve seat, and a second position wherein said valve assembly portion is spaced from said valve seat.

6. An internal combustion engine in accordance with claim 5 wherein said means for locating said valve assembly in said passage portion includes a housing having a first chamber and a second chamber, a diaphragm separating said chambers, and means connecting said valve assembly to said diaphragm to effect movement of said valve assembly by diaphragm movement in response to pressure changes in said chambers.

7. An internal combustion engine in accordance with claim 3 wherein said first housing has a hollow interior including an upper portion having therein a rim partially defining said valve seat surface, and a lower portion larger than said rim.

8. An internal combustion engine in accordance with claim 7 wherein said first housing passageway comprises a pair of opposite apertures communicable with said upper portion of said hollow interior.

9. An internal combustion engine in accordance with claim 3 wherein said second housing is hollow, and wherein said second housing passageway comprises three voids defined by three spaced ribs extending from said second housing.

10. An internal combustion engine in accordance with claim 3 wherein said means releasably connecting said first housing to said second housing comprises one of said second housing and said first housing including a threaded male portion, and the other of said second housing and said first housing including a mating female portion.

11. A valve assembly for an internal combustion engine which internal combustion engine including a coolant conduit having an upstream conduit portion, a downstream conduit portion, and a passage portion extending between and, connecting the upstream conduit portion and the downstream conduit portion, said valve assembly being adapted to be located interiorly of the passage portion and including, a first housing including a passageway communicable with the downstream conduit portion, a second housing including a passageway communicable with the upstream conduit portion, means for releasably connecting together said first housing and said second housing so as to form a housing assembly adapted to be located interiorly of the passage portion and including interiorly thereof a combined passage formed by said passageways, one of said housings including a valve seat surface partially defining said combined passage, and temperature responsive means located within said housing assembly and including a valve surface selectively engagable with said valve seat surface to control coolant flow through said combined passageway.

12. A valve assembly in accordance with claim 11 wherein said temperature responsive means comprises a valve unit including a container portion having therein a temperature responsive material, and a piston movable relative to said valve seat surface in response to expansion and contraction of said temperature responsive material and engageable with one of said housings to displace said valve surface away from said valve seat surface in response to expansion of said temperature responsive material, and biasing means operable between said valve unit and the other of said housings for biasing said valve surface towards said valve seat surface.

13. A valve assembly in accordance with claim 11 wherein said first housing has a hollow interior including an end portion having therein a rim defining said valve seat surface, and a lower portion larger than said rim.

14. A valve assembly in accordance with claim 13 wherein said first housing passageway comprises a pair of opposite aperatures communicable with said end portion of said hollow interior.

15. A valve assembly in accordance with claim 11 wherein said second housing is hollow, and wherein said second housing passageway comprises three spaced ribs defining therebetween three voids.

16. A valve assembly in accordance with claim 11 wherein said means releasably connecting said first housing to said second housing comprises one of said second housing and said first housing including a threaded male portion, and the other of said second housing and said first housing including a mating female portion.

* * * * *